US00RE48786E

(19) United States
(12) Reissued Patent
Lee

(10) Patent Number: US RE48,786 E
(45) Date of Reissued Patent: *Oct. 26, 2021

(54) STEERING SHAFT MODIFIER

(71) Applicant: Hyun-Eui Lee, Seoul (KR)

(72) Inventor: Hyun-Eui Lee, Seoul (KR)

( * ) Notice: This patent is subject to a terminal disclaimer.

(21) Appl. No.: 16/122,282

(22) Filed: Sep. 5, 2018

Related U.S. Patent Documents

Reissue of:
(64) Patent No.: 9,434,442
Issued: Sep. 6, 2016
Appl. No.: 14/949,392
Filed: Nov. 23, 2015

U.S. Applications:
(63) Continuation-in-part of application No. 14/173,498, filed on Feb. 5, 2014, now Pat. No. 9,211,933.

(30) Foreign Application Priority Data

Jan. 20, 2014 (KR) ..... 10-2014-0006889

(51) Int. Cl.
*B62K 21/18* (2006.01)
*B62K 21/22* (2006.01)
(Continued)

(52) U.S. Cl.
CPC ..... *B62K 21/22* (2013.01); *B62K 19/32* (2013.01); *B62K 21/06* (2013.01)

(58) Field of Classification Search
CPC ..... B62K 21/22; B62K 21/06; B62K 19/32
See application file for complete search history.

(56) References Cited

U.S. PATENT DOCUMENTS 4,565,384 A 1/1986 Dehnisch
4,600,207 A 7/1986 Zosi
(Continued)

FOREIGN PATENT DOCUMENTS

JP 3044981 U 10/1997
JP 3044984 U 10/1997
(Continued)

OTHER PUBLICATIONS

International Search Report and Written Opinion for PCT Application No. PCT/KR2015/000582, dated May 20, 2015.
(Continued)

*Primary Examiner* — Jeffrey R Jastrzab
(74) *Attorney, Agent, or Firm* — Fish & Richardson P.C.

(57) ABSTRACT

There is provided a steering shaft modifier, capable of fundamentally preventing distortion generated in a new steering shaft, being easing aligned, and being simply assembled, including: a frame having a steering shaft penetrating portion formed in a front surface thereof and having a contact surface covering a portion of the steering head and disposed to be in contact with an upper bearing installation portion of a steering shaft installation portion; a shaft including a head portion caught by a lower bearing installation portion of the steering shaft installation portion of the steering head, a body portion passing through the steering shaft installation portion, and a connection portion connected to the frame; and a frame block including a lower contact surface tightly attached to a lower surface of the steering head in the rear of the lower bearing installation portion and coupled to the frame when installed.

24 Claims, 7 Drawing Sheets

AMENDED

(51) Int. Cl.
*B62K 19/32* (2006.01)
*B62K 21/06* (2006.01)

(56) References Cited

U.S. PATENT DOCUMENTS

| | | | | |
|---|---|---|---|---|
| 5,967,538 | A | 10/1999 | Callaluca et al. | |
| 7,111,861 | B2 | 9/2006 | Pender | |
| 7,438,306 | B2 | 10/2008 | Mrdeza et al. | |
| 7,637,521 | B2 | 12/2009 | Grant | |
| 9,079,631 | B1 * | 7/2015 | Costa | B62K 21/22 |
| 2006/0022427 | A1 | 2/2006 | Grant | |
| 2006/0060405 | A1 * | 3/2006 | Pender | B62K 19/32 180/219 |
| 2008/0100028 | A1 | 5/2008 | Mrdeza et al. | |

FOREIGN PATENT DOCUMENTS

| | | |
|---|---|---|
| KR | 1325494 | 11/2013 |
| KR | 101325494 | 11/2013 |
| KR | 101325494 B1 * | 11/2013 |

OTHER PUBLICATIONS

Office Actioin for Korean Patent Application No. 10-2014-0006889 dated May 19, 2015.
International Search Report and Written Opinion for PCT Application No. PCT/KR2015/000582, dated May 20, 2015, 10 pages.

* cited by examiner

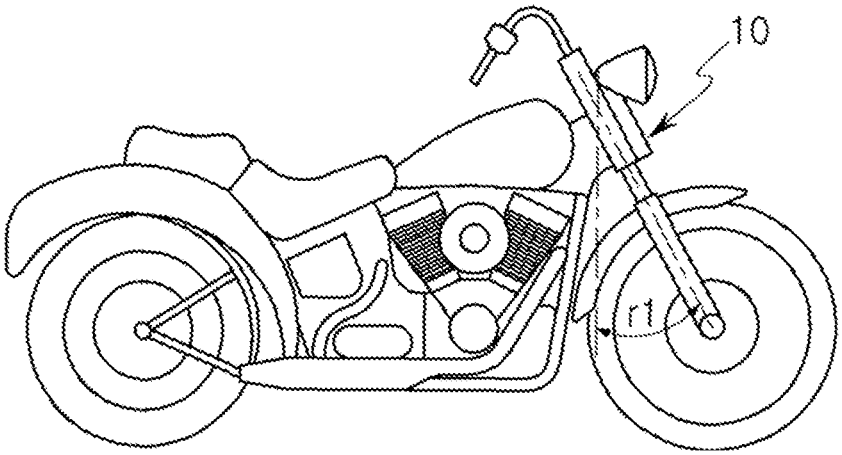
Prior Art
FIG. 1
AMENDED
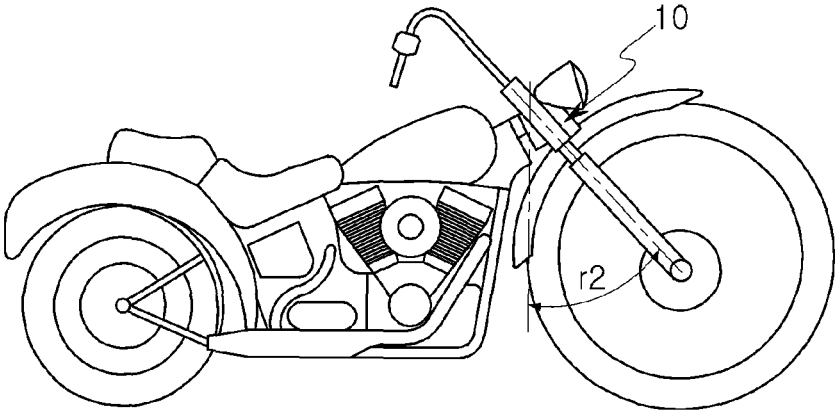
Prior Art
FIG. 2
AMENDED

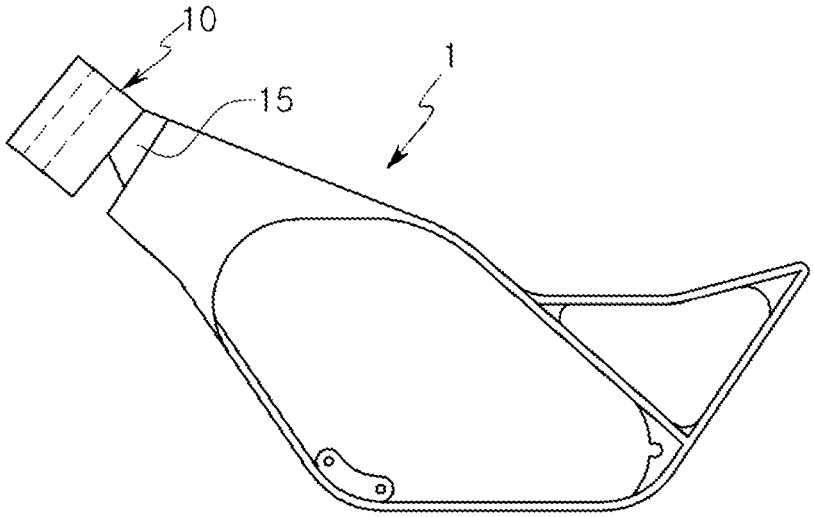
Prior Art
FIG. 3
AMENDED
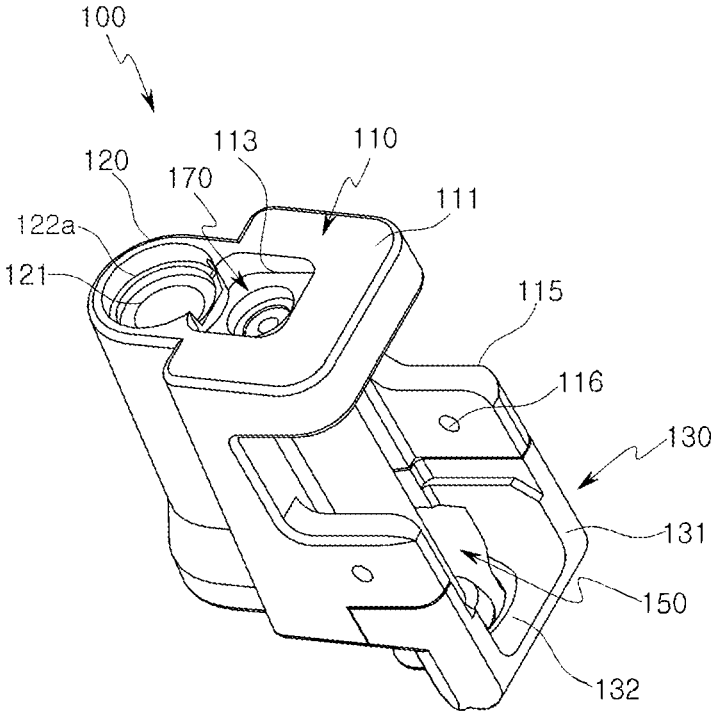
FIG. 4
AMENDED

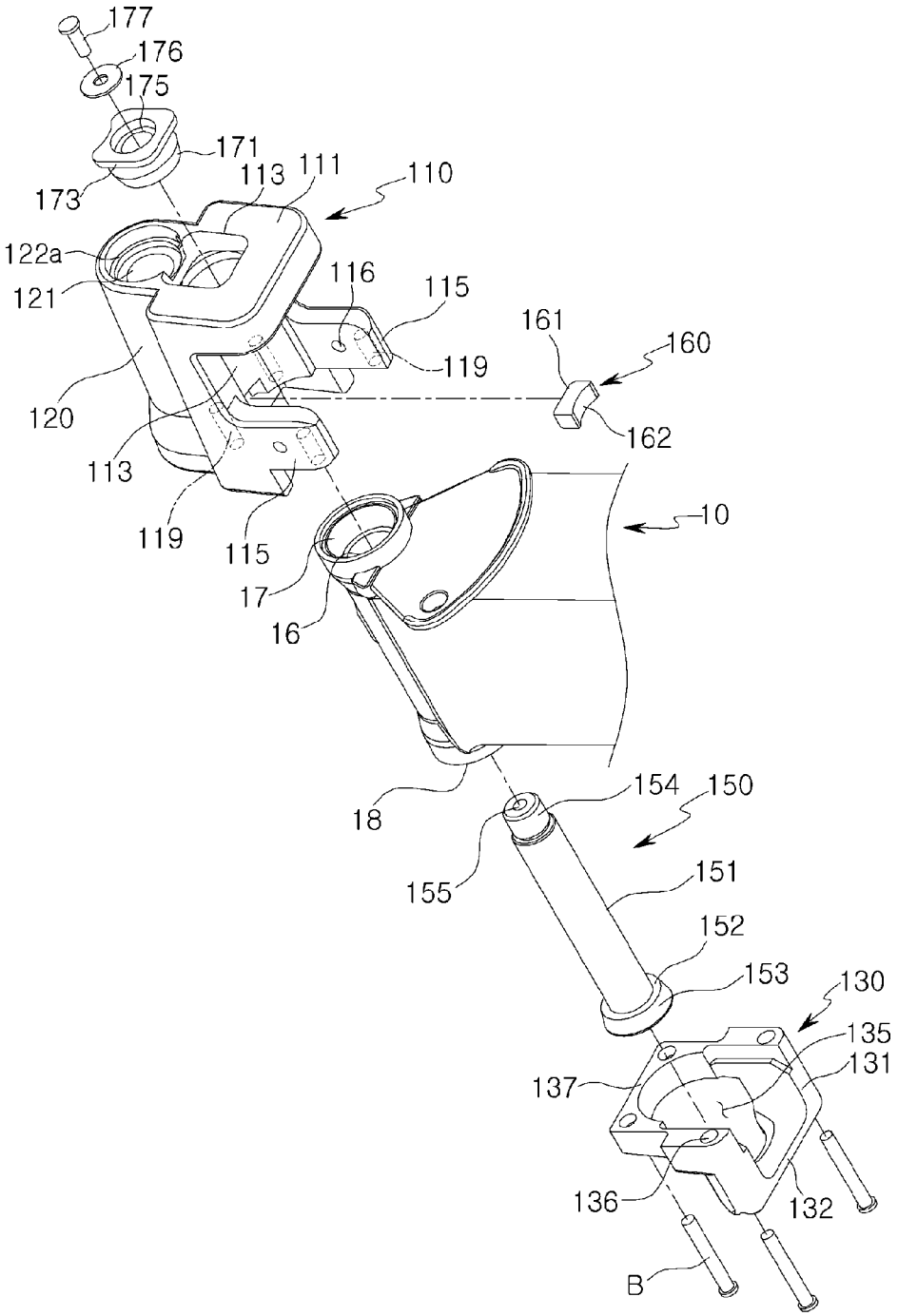
FIG. 5
AMENDED

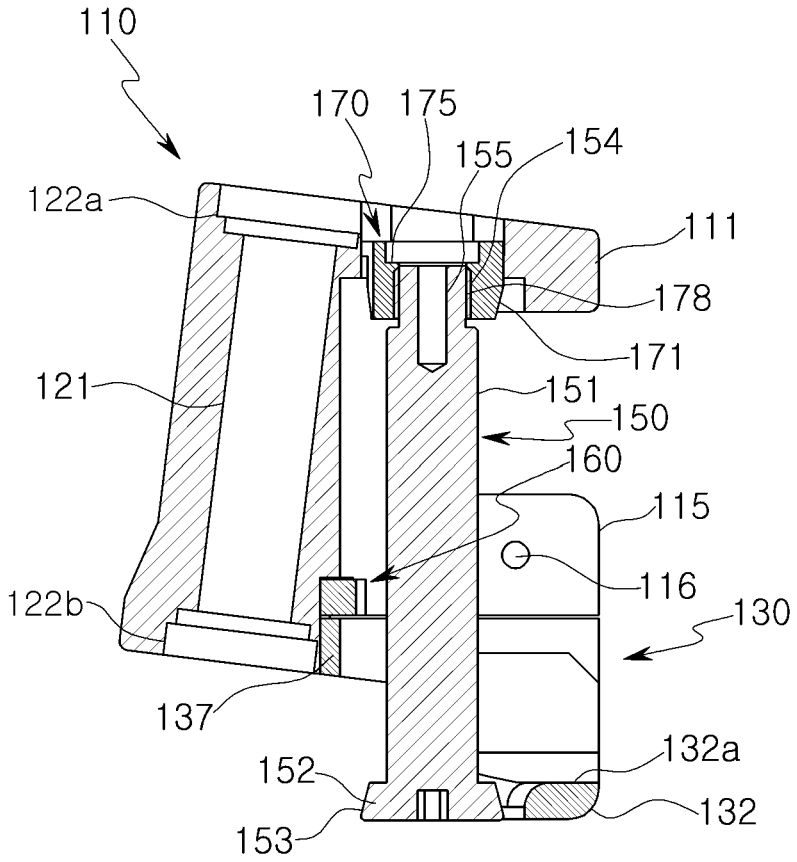
FIG. 8
AMENDED

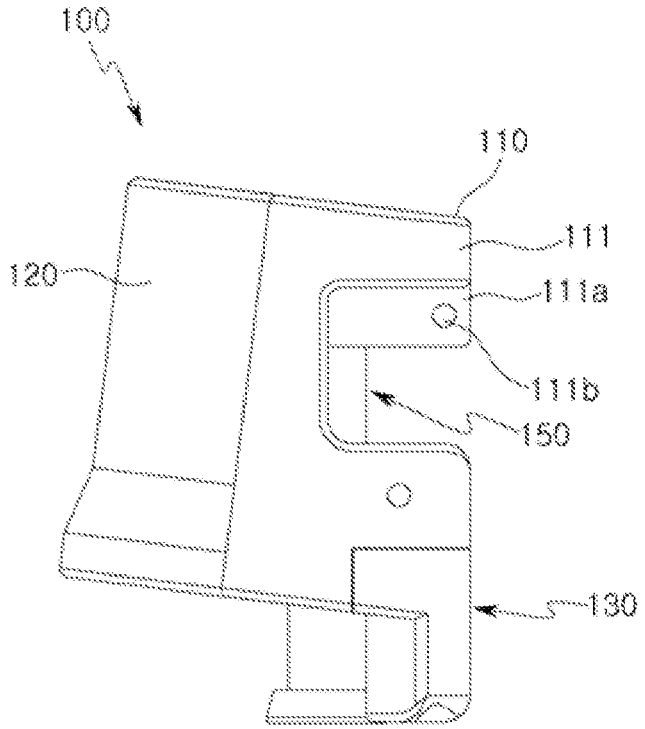
FIG. 9
AMENDED

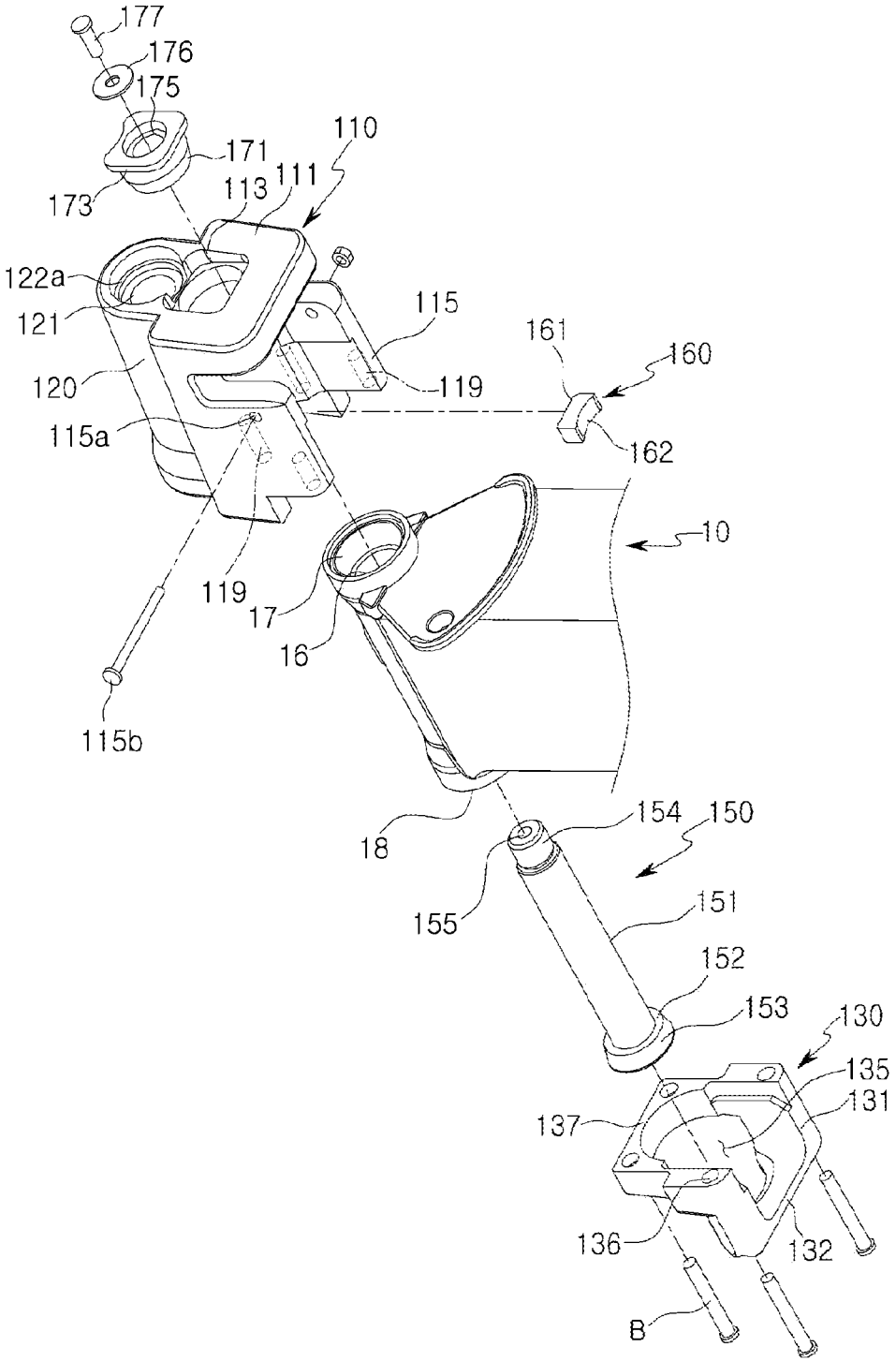
FIG. 10
AMENDED

STEERING SHAFT MODIFIER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is *a Reissue of U.S. patent application Ser. No. 14/949,392, filed on Nov. 23, 2018, now U.S. Pat. No. 9,434,442, issued on Sep. 6, 2016, which is* a Continuation-in-Part of U.S. patent application Ser. No. 14/173,498 filed on Feb. 5, 2014*, now U.S. Pat. No. 9,211,933, issued on Dec. 15, 2015,* which claims the benefit of Korean Patent Application No. 10-2014-0006889 filed on Jan. 20, 2014, the [disclosure] *disclosures* of [both applications] *which* are incorporated herein by reference *in their entireties. A claim of priority is made to each of the above disclosed applications*.

BACKGROUND

The present disclosure relates to a steering shaft modifier of a two-wheeled vehicle and, more particularly, to a steering shaft modifier providing structural stability while being easily assembled.

FIG. 1 illustrates a related art two-wheeled [15] vehicle, namely, a motorcycle. As illustrated in FIG. 1, a rake angle r1 refers to an angle between a line extending from a fork and a steering head.

Recently, users have increasingly converted motorcycles according to individual preferences, and in converting motorcycles according to individual preferences, the use of large wheels as front wheels illustrated in FIG. 2 has increased.

In case of using a large wheel, an existing motorcycle component may not be sustained due to interference, and thus, a conversion scheme of increasing a rake angle r2 as illustrated in FIG. 2 or moving a triple tree upwards to secure a space portion to accommodate a large wheel has been proposed.

FIG. 3 illustrates a related art conversion scheme. In the related art, in order to change a position of a steering shaft, a method of increasing a rake angle by cutting out a steering head [100] *10* from a motorcycle frame 1 and attaching the steering head [100] *10* to the motorcycle frame 1 with an intermediate member [150] *15* interposed therebetween is used.

In this case, however, cutting and welding the frame 1 which plays a key role in vehicle security severely undermine vehicle security, and conversion itself may be regarded as being illegal.

Meanwhile, aside from the use of a large wheel, in order to simply change a rake angle, Patent Document 1 proposes a modifier installed in a steering head in order to increase a rake angle.

However, in Patent document 1, a steering shaft is [20] formed through blocks extending from upper and lower surfaces of the steering head, a new steering shaft is formed at a position equal to that of the steering head, and since the steering shaft is configured to increase a rake angle, a space portion between the new steering shaft [25] and the steering head is increased, making no change in height, and thus, it is not appropriate for a large wheel. Also, since the steering shaft is connected to the steering head only through the block, connection strength may not be secured.

RELATED ART DOCUMENT (Patent Document 1) U.S. Patent Registration No. U.S. Pat. No. 7,438,306B2

SUMMARY

An aspect of the present disclosure may provide a steering shaft modifier capable of fundamentally preventing distortion generated in a new steering shaft due to metical tolerance, or the like, in a case in which blocks are provided in upper and lower portions as in the related art, and capable being easily aligned to simplify assembly.

An aspect of the present disclosure may also provide a steering shaft modifier capable of providing structural stability by transmitting impact applied to a front side thereof to a steering head.

An aspect of the present disclosure may also provide a steering shaft modifier allowing a general user, rather than an expert, to easily install or detach the steering shaft modifier.

According to an aspect of the present disclosure. a steering shaft modifier installed in a steering head of a motorcycle to modify a steering shaft may include: a frame having a steering shaft penetrating portion formed in a front surface thereof and having a contact surface covering a portion of the steering head and disposed to be in contact with an upper bearing installation portion of a steering shaft installation portion; a shaft including a head portion caught by a lower bearing installation portion of the steering shaft installation portion of the steering head, a body portion passing through the steering shaft installation portion, and a connection portion connected to the frame; and a frame block including a lower contact surface tightly attached to a lower surface of the steering head in the rear of the lower bearing installation portion and coupled to the frame when installed.

The frame may cover at least a portion of a front surface of the steering head, and a contact protrusion part having a contact surface having a shape corresponding to the front surface of the steering head may be disposed in an inner surface of the frame corresponding to the front surface of the steering head.

The frame may include: the steering shaft penetrating portion; an upper block extending backwardly from an upper portion of the steering shaft penetrating portion and coupled with the shaft; and a wing portion connected to the steering shaft penetrating portion and extending to a lateral surface of the steering head.

The upper block may be configured as a separate component to which the shaft is coupled and may include: a shaft coupling part to which the shaft is coupled; and a coupling hole in which the shaft coupling part is inserted and installed, wherein the connection portion of the shaft and the shaft coupling part may be screw-coupled.

A screw hole may be formed in an end portion of the connection portion of the shaft, and the shaft coupling part may include a bolt to be coupled with the screw hole.

The contact protrusion part may be formed in an inner surface of the frame and may be inserted into a recess with an opened lower surface.

The head portion of the shaft may have a sloped surface sloped in a length direction of the shaft.

The shaft coupling part may be configured as a separate component from the frame and include an insertion portion having a lower surface inserted into the upper bearing installation portion of the steering shaft installation portion, and the insertion portion may have a surface sloped in the length direction of the shaft.

The frame block may include a space portion opened to allow a lower portion of the steering head to be disposed therein when installed, and the frame block may be formed to have a step such that a steering shaft penetration side is higher than the other side.

Coupling units may be fastened to four corners with the space portion as a center to couple the frame block and the frame.

The steering shaft penetration portion may be positioned such that a lower surface thereof is higher than the lower contact surface of the frame block, and may include a through hole sloped toward the shaft.

The upper block may include an extending portion covering a through hole formed in a lateral surface of the steering head, and a fastening hole may be formed in the extending portion, and may further include a fastening bolt passing through the fastening hole and the through hole.

According to another aspect of the present disclosure, a steering shaft modifier installed in a steering head of a motorcycle to modify a steering shaft may include: a frame having a steering shaft penetrating portion formed in a front surface thereof and covering a portion of the steering head from above; a shaft penetrating through a steering shaft installation portion of the steering head; and a frame block having at least a portion disposed in a rear side, relative to the steering shaft installation portion, and disposed below the steering head, wherein the shaft and the frame may be screw-coupled to pressurize the steering shaft installation portion of the steering head from above and below, and the frame and the frame block may be coupled through a coupling unit to pressurize an upper portion of the steering shaft installation portion of the steering head and a lower surface of the steering head.

BRIEF DESCRIPTION OF DRAWINGS

The above and other aspects, features and other advantages of the present disclosure will be more clearly understood from the following detailed description taken in conjunction with the accompanying drawings, in which:

FIG. 1 is a schematic view illustrating a related art motorcycle;

FIG. 2 is a schematic view illustrating a motorcycle converted with a large wheel;

FIG. 3 is a schematic view illustrating a frame of the related art motorcycle in the event of conversion;

FIG. 4 is a perspective view illustrating a steering shaft modifier according to an exemplary embodiment of the present disclosure;

FIG. 5 is an exploded perspective view illustrating the steering shaft modifier according to an exemplary embodiment of the present disclosure;

FIG. 8 is a cross-sectional view illustrating the steering shaft modifier according to an exemplary embodiment of the present disclosure;

FIG. 9 is a side view illustrating a steering shaft modifier according to another exemplary embodiment of the present disclosure; and FIG. 10 is an exploded perspective view illustrating a steering shaft modifier according to another exemplary embodiment of the present disclosure.

DETAILED DESCRIPTION

Figure 6:
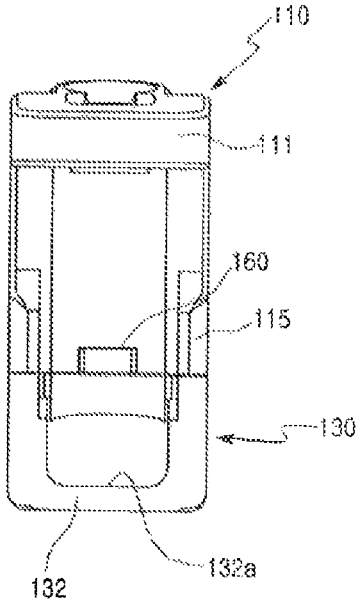
FIG. 6 is a rear view illustrating the steering shaft modifier according to an exemplary embodiment of the present disclosure.

Hereinafter, exemplary embodiments of the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 7:
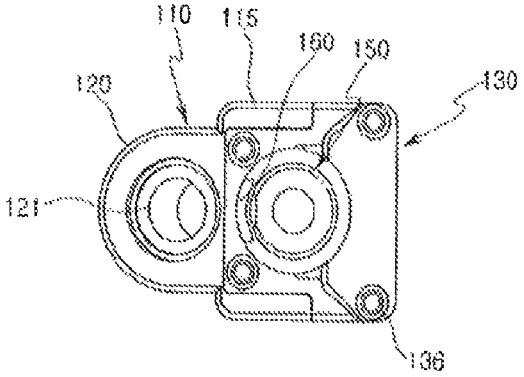
FIG. 7 is a bottom view illustrating the steering shaft modifier according to an exemplary embodiment of the present disclosure.

FIGS. 4 through 8 illustrate a steering shaft modifier according to an exemplary embodiment of the present disclosure. Specifically, FIG. 4 is a perspective view illustrating a steering shaft modifier according to an exemplary embodiment of the present disclosure, FIG. 5 is an exploded perspective view illustrating the steering shaft modifier according to an exemplary embodiment of the present disclosure, FIG. 6 is a rear view illustrating the steering shaft modifier according to an exemplary embodiment of the present disclosure, FIG. 7 is a bottom view illustrating the steering shaft modifier according to an exemplary embodiment of the present disclosure, and FIG. 8 is a cross-sectional view illustrating the steering shaft modifier according to an exemplary embodiment of the present disclosure.

As illustrated in FIGS. 4 and 5, a steering shaft modifier 100 according to an exemplary embodiment of the present disclosure may include: a frame 110 having a steering shaft penetrating portion 120 formed in a front surface thereof and having a contact surface covering a portion of the steering head 10 and disposed to be in contact with an upper bearing installation portion 17 of a steering shaft installation portion 16; a shaft 150 including a head portion 152 caught by a lower bearing installation portion 18 of the steering shaft installation portion 16 of the steering head 10, a body portion 151 passing through the steering shaft installation portion 16, and a connection portion 154 connected to the frame 110; and a frame block 130 including a lower contact surface 132a tightly attached to a lower surface of the steering head 10 in the rear of the lower bearing installation portion 18 and coupled to the frame 100 when installed.

In the present exemplary embodiment, the frame 110 includes the steering shaft penetrating portion 120 integrally formed in a front surface thereof; an upper block 111 extending backwards from an upper portion of the steering shaft penetrating portion 120 and coupled with the shaft 150; and a wing portion connected to the steering shaft penetrating portion 120 and extending to a lateral surface of the steering head 10.

The steering shaft penetrating portion 120 is positioned such that a lower surface is higher than the lower contact surface 132a of the frame block 130 and has a through hole 121 sloped with respect to the shaft 150, whereby a new steering shaft may provide a larger rake angle at a position higher than the steering shaft installation portion 16 (please see FIG. 8), and thus, it is advantageous for installing a large wheel.

The steering shaft penetrating portion 120 has the through hole 121 formed in a center thereof in which upper and lower bearing insertion portions 122a and 122b are provided to allow bearings to be insertedly installed. The bearing insertion portions 122a and 122b may have a size equal to those of the upper and lower bearing installation portions 17 and 18 of the steering head 10 to allow an existing bearing used in the steering shaft to be re-used when a steering shaft modifier is installed.

Meanwhile, the frame 110 covers at least a portion of a front surface of the steering head 10 in a rear surface of the steering shaft penetrating portion 120. A contact protrusion part 160 having a contact surface 162 having a shape corresponding to the front surface of the steering head 10 may be disposed in an inner surface of the frame 110 corresponding to the front surface of the steering head 10. A recess 114 is formed with a lower surface thereof open in order to allow the contact protrusion part 160 to be insertedly disposed therein. After the contact protrusion part 160 is inserted in the recess 114, the frame block 130 is coupled to the frame 110 to block the open lower surface of the recess 114, thus fixing the position of the contact protrusion part 160.

The contact protrusion part 160 includes a portion 161 accommodated in the recess 114 and formed of the contact surface 162 protruded from the inner surface of the frame 110 and having a shape corresponding to the front surface of the steering head 10. The contact protrusion part 160 is in contact with the steering head 160, and thus, when impact is applied to the steering shaft modifier 100, it may be transmitted to the steering head 10.

The upper block 111 formed to extend backwardly 10 from an upper portion of the steering shaft penetrating portion 120 has a width greater than that of the steering shaft penetrating portion 120. The upper block 111 has a coupling hole 113 formed in a central portion thereof, and a shaft coupling part 170 configured to connect the shaft 150 and the upper block 111 is disposed in the coupling hole 113.

In the present exemplary embodiment, the shaft coupling part 170 is configured as a separate component from the frame 110, but the present disclosure is not limited thereto and the shaft coupling part 170 may be integrally formed with the upper block 111 without the coupling hole 113.

The shaft coupling part 170 has a shape corresponding to that of the coupling hole 113 and includes a stop protrusion 173 transmitting force generated through coupling with the shaft 150, an internal hole 178 having thread formed therein to be connected with the shaft 150, a step 175 formed in an inner surface of the internal hole 178, a washer 176 caught by the step 175, and a bolt 177 fastened to a screw hole 155 formed in the shaft 150 and passing through the washer 176.

Also, the shaft coupling part 170 has a contact surface 171 sloped with respect to a shaft extending direction and inserted into the upper bearing installation 10 portion 17 in an outer surface thereof. The sloped contact surface 171, when installed, comes into contact with the upper bearing installation portion 17 in order to fix the steering shaft modifier.

Wing portions 115 are formed in both lateral sides of the frame 110. The wind portions 115 extend backwardly, relative to the lower bearing installation portion 18, and have a length corresponding to that of the frame block 130. Bolt holes 119 are formed in the wing portions 115 and a lower surface of the steering shaft penetrating portion 120. As bolts *B* are fastened to the bolt holes 119 through the frame block 130, the frame 110 and the frame block 130 according to the present exemplary embodiment are coupled.

Each of the wing portions 115 has through holes 116 formed therein, and the through holes 116 have threads formed therein. Bolts (not shown) are fastened to the threads and come into contact with the steering head 10 so as to be fixed in position.

The frame block 130 is fastened to a lower portion of the frame 110 by the bolts *B* and includes a body 131 surrounding the steering head 10 such that a lower portion of the steering head 10 is disposed therein when installed. Through holes 136 formed in a front portion 137 of the body 131 are formed at positions corresponding to the bolt holes 119 formed in the steering shaft penetrating portion 120 of the frame 110, and through holes 136 formed in a rear portion 132 of the body 131 are formed at positions corresponding to the bolt holes 119 formed in the wing portions 115 of the frame 110. The body 131 of the frame block 130 has a step such that the front portion 137 is higher than the rear portion 132.

When the frame 110 and the frame block 130 are coupled, the lower contact surface 132a of the rear portion 132 of the frame block 130 is tightly attached to a lower surface of the steering head 10, and pressure applied during fastening by the bolts B acts as normal force generating frictional force between the steering head 10 and the lower contact surface 132a, providing structural stability in fixing the steering shaft modifier 100 including the frame block 130.

The shaft 150 is inserted into the steering shaft installation portion 16 of the steering head 10 through a space portion 135 of the frame block 130. The shaft 150 includes the head portion 152 caught by the lower bearing installation portion 18 of the steering shaft installation portion 16 of the steering head 10, the body portion 151 passing through the steering shaft installation portion 16, and the connection portion 154 connected to the frame 110. The screw hole 155 is formed in an end portion of the connection portion 154 of the shaft 150 to which the bolt 177 of the shaft coupling part 170 is fastened.

The connection portion 154 has a thread formed on an outer surface thereof and screw-coupled to the internal hole 178 of the shaft coupling part 170. Namely, after the frame 110 is disposed above the steering shaft installation portion 16, the shaft 150 is inserted into the steering shaft installation portion 16, and the head portion 152 is rotated to fasten the connection portion 154 to the internal hole 178 of the shaft coupling part 170, thereby coupling the shaft 150 and the frame 110.

The head portion 152 of the shaft 150 has a sloped portion 153 sloped in a length direction of the shaft 150. The sloped portion 153 comes into contact with the lower bearing installation portion 18 of the steering shaft installation portion 16 and provides a push force based on rotation in order to fix the steering shaft modifier to the steering head 10.

As illustrated in FIG. 7, the head portion 152 of the shaft 150 and the space portion 135 have a circular shape on the plane, and here, the head portion 152 of the shaft 150 has a diameter smaller than that of the space portion 135 such that no interference occurs when the shaft 150 enters the space portion 135.

Meanwhile, a cross recess (not shown), or the like, may be formed in a lower surface of the head portion 152 of the shaft 150 to transmit rotary power, and the cross recess may allow the shaft 150 to be rotated through a tool, or the like.

FIG. 8 is a cross-sectional view illustrating an assembled state of the steering shaft modifier 100 according to an exemplary embodiment of the present disclosure. As illustrated in FIG. 8, the shaft 150 and the frame 110 are fixed by pressurizing the upper and lower bearing installation portions 17 and 18 of the steering shaft installation portion 16, and the frame 110 and the frame block 130 are fixed by pressurizing the upper bearing installation portion 17 and the lower surface of the steering head 10. In the present exemplary embodiment, structural stability may be provided through the dual fixing.

Also, in the present exemplary embodiment of the present disclosure, since an additional member is not added to a lower portion of the shaft 150 and the shaft 150 is coupled through the frame block 130, a lower space of the steering head 10 may be secured, allowing a large wheel to be introduced.

For example, in the case of the related art, a block is disposed in a lower portion of a steering head, narrowing the space for a wheel to be introduced. In comparison, in the present exemplary embodiment of the present disclosure, dual-stability may be provided and a larger space may be secured through the frame block 130 coupled with the shaft 150 in the rear of the steering head 10, facilitating installation of a large wheel.

Also, in the present exemplary embodiment of the present disclosure, the steering shaft penetrating portion 120 is integrally formed in the frame 110 rather than being formed by coupling two members, eliminating the potential of dislocation due to assembling of the steering shaft penetrating portion 120. Namely, precise alignment is not required in the assembling operation, thus providing convenience to an operator in the assembling operation.

FIG. 9 is a side view illustrating a steering shaft modifier according to another exemplary embodiment of the present disclosure. The steering shaft modifier according to the exemplary embodiment of FIG. 9 is similar to that of FIGS. 4 through 8, except that the upper block 111 includes an extending portion 111a covering a through hole formed in a lateral surface of the steering head 10, the extending portion 111a has a fastening hole 111b, and a fastening bolt (not shown) is fastened to the fastening hole 111b through the through hole.

Namely, in the steering shaft modifier according to the exemplary embodiment of FIG. 9, the extending portion 111a is formed in the upper block 111, the fastening hole 111b is formed in the extending portion 111a, and the fastening bolt penetrates through the fastening hole 111b and the through hole (not shown) of the steering head 12, connecting them and extending to the lateral surface. Since impact applied to the lateral surface is transmitted to the steering head 10, additional structural stability may be provided.

FIG. 10 is an exploded perspective view illustrating a steering shaft modifier according to another exemplary embodiment of the present disclosure.

The steering shaft modifier according to the present exemplary embodiment is similar *to* that of the exemplary embodiment of FIGS. 4 through 8, but the wing portions 115 are formed to extend to be adjacent to the upper block 111, fastening holes 115a are formed in the [25] wing portions 115, and a bolt 115b may be fastened to a through hole of the steering head 10 through the fastening holes 115a. Here, the wing portions 115 near the fastening holes 115a may be formed to be thicker than lower wing portions, securing durability.

As set forth above, according to exemplary embodiments of the present disclosure, a steering shaft modifier capable of fundamentally preventing distortion that may be generated in the new steering shaft due to mechanical tolerance in terms of manufacturing, being easily aligned, and being simply assembled may be provided.

Also, by transmitting impact applied to a lateral surface of a front side to a steering head, the steering shaft modifier may provide structural stability.

By facilitating alignment, or the like, a general user, rather than an expert, may easily install or detach the steering shaft modifier.

While exemplary embodiments have been shown and described above, it will be apparent to those skilled in the art that modifications and variations could be made without departing from the spirit and scope of the present disclosure as defined by the appended claims.

What is claimed is:

1. A steering shaft modifier installed in a steering head of a motorcycle to modify a steering shaft, the steering shaft modifier comprising:

a steering shaft penetration portion having a through hole and formed as a single part; and a frame covering at least a portion of a front surface of the steering head, wherein the frame is fixed to a steering shaft installation portion of the steering head, the frame comprises an upper block extending from an upper portion of the steering shaft [penetrating] *penetration* portion, the upper block having a coupling hole formed therein, and wherein the coupling hole mounts a shaft coupling part which is inserted to the steering shaft installation portion[; and], the steering shaft penetration portion has upper and lower bearing insertion portions[and], *and* the steering shaft penetration portion [is positioned such that] *extends along a first axis, and the steering shaft installation portion extends in a second axis that intersects with the first axis at a reference point, wherein a first distance between the reference point and* the lower bearing insertion portion of the steering shaft penetration portion is [higher] *shorter* than *a second distance between the reference point and* a lower bearing installation portion of the steering shaft installation portion.

2. The steering shaft modifier of claim 1, further comprising wing portions connected to the steering shaft penetration portion and extending to either lateral surface of the steering head to cover both lateral [side] *sides* of the steering head.

3. The steering shaft modifier of claim 2, wherein the through hole of the steering shaft [penetrating] *penetration* portion is sloped toward the steering shaft.

4. The steering shaft modifier of claim 1, wherein the shaft coupling part comprises a sloped contact surface in the length direction of the shaft coupling part, which contacts [a] *an* upper bearing installation portion of the steering shaft installation portion of the steering head, whereby the frame is fixed *to* the steering head.

*5. A steering shaft modifier installed in a steering head of a motorcycle to modify a steering shaft, the steering shaft modifier comprising:*

*a steering shaft penetration portion having a through hole and formed as a single part; and*

*a frame covering at least a portion of a front surface of the steering head,*

*wherein the frame is fixed to a steering shaft installation portion of the steering head, the frame comprises an*

*upper block extending from an upper portion of the steering shaft penetration portion, the upper block having a coupling hole formed therein, and wherein the coupling hole mounts a part which is at least partially inserted to the steering shaft installation portion; and the steering shaft penetration portion has upper and lower bearing insertion portions, and the steering shaft penetration portion is positioned such that the lower bearing insertion portion of the steering shaft penetration portion is higher than a lower bearing installation portion of the steering shaft installation portion, a lower end of the lower bearing insertion portion of the steering shaft penetration portion being spaced apart from an upper end of the lower bearing installation portion of the steering shaft installation portion in an upwardly-extending direction of the steering shaft installation portion.*

*6. The steering shaft modifier of claim 5, further comprising wing portions connected to the steering shaft penetration portion and extending to either lateral surface of the steering head to cover both lateral sides of the steering head.*

*7. The steering shaft modifier of claim 6, wherein the through hole of the steering shaft penetration portion is sloped toward the steering shaft.*

*8. The steering shaft modifier of claim 5, wherein the part includes a sloped contact surface in the length direction of the part, which contacts the steering shaft installation portion of the steering head, whereby the frame is fixed the steering head.*

*9. The steering shaft modifier of claim 5, wherein the part has a shape corresponding to a shape of the coupling hole of the frame.*

*10. The steering shaft modifier of claim 5, wherein the part includes a shaft coupling part.*

*11. A steering shaft modifier installed in a steering head of a motorcycle to modify a steering shaft, the steering shaft modifier comprising:*

*a steering shaft penetration portion having a through hole; and*

*a frame formed integrally with the steering shaft penetration portion and configured to cover at least a portion of a front surface of the steering head,*

*wherein the frame is fixed to a steering shaft installation portion of the steering head, the frame comprises an upper block extending from an upper portion of the steering shaft penetration portion, the upper block having a coupling hole formed therein, and wherein the coupling hole mounts a part which is mounted to the steering shaft installation portion; and the steering shaft penetration portion has upper and lower bearing insertion portions, and the steering shaft penetration portion is positioned such that the lower bearing insertion portion of the steering shaft penetration portion is higher than a lower bearing installation portion of the steering shaft installation portion, the steering shaft penetration portion having a length shorter than the steering shaft installation portion.*

*12. The steering shaft modifier of claim 11, wherein the part includes a sloped contact surface in the length direction of the part, which contacts the steering shaft installation portion of the steering head, whereby the frame is fixed the steering head.*

*13. The steering shaft modifier of claim 11, wherein the part has a shape corresponding to a shape of the coupling hole of the frame.*

*14. The steering shaft modifier of claim 11, wherein the part includes a shaft coupling part.*

*15. A two-wheeled vehicle comprising:*

*a steering shaft;*

*a steering head;*

*a steering shaft modifier configured to be installed in the steering head, the steering shaft including:*

*a steering shaft penetration portion having a through hole and formed as a single part; and*

*a frame covering at least a portion of a front surface of the steering head,*

*wherein the frame is fixed to a steering shaft installation portion of the steering head, the frame comprises an upper block extending from an upper portion of the steering shaft penetration portion, the upper block having a coupling hole formed therein, and wherein the coupling hole mounts a part which is at least partially inserted to the steering shaft installation portion; and the steering shaft penetration portion has upper and lower bearing insertion portions, and*

*wherein the steering shaft penetration portion extends along a first axis, and the steering shaft installation portion extends in a second axis that intersects with the first axis at a reference point, wherein a first distance between the reference point and the lower bearing insertion portion of the steering shaft penetration portion is shorter than a second distance between the reference point and a lower bearing installation portion of the steering shaft installation portion.*

*16. The two-wheeled vehicle of claim 15, further comprising wing portions connected to the steering shaft penetration portion and extending to either lateral surface of the steering head to cover both lateral sides of the steering head.*

*17. The two-wheeled vehicle of claim 16, wherein the through hole of the steering shaft penetration portion is sloped toward the steering shaft.*

*18. The two-wheeled vehicle of claim 15, wherein the part includes a sloped contact surface in the length direction of the part, which contacts the steering shaft installation portion of the steering head, whereby the frame is fixed the steering head.*

*19. The two-wheeled vehicle of claim 15, wherein the part has a shape corresponding to a shape of the coupling hole of the frame.*

*20. The two-wheeled vehicle of claim 15, wherein the part includes a shaft coupling part.*

*21. A steering shaft modifier installed in a steering head of a motorcycle to modify a steering shaft, the steering shaft modifier comprising:*

*a steering shaft penetration portion having a through hole; and*

*a frame formed integrally with the steering shaft penetration portion and configured to cover at least a portion of a front surface of the steering head,*

*wherein the frame is fixed to a steering shaft installation portion of the steering head,*

*the frame comprises an upper block extending from an upper portion of the steering shaft penetration portion, the upper block having a coupling hole formed therein, and wherein the coupling hole mounts a part which is mounted to the steering shaft installation portion; and*

*the steering shaft penetration portion has upper and lower bearing insertion portions, and the steering shaft penetration portion extends along a first axis, and the*

*steering shaft installation portion extends in a second axis that intersects with the first axis at a reference point, wherein a first distance between the reference point and the lower bearing insertion portion of the steering shaft penetration portion is shorter than a second distance between the reference point and a lower bearing installation portion of the steering shaft installation portion.*

*22. The steering shaft modifier of claim 21, wherein the part includes a sloped contact surface in the length direction of the part, which contacts the steering shaft installation portion of the steering head, whereby the frame is fixed the steering head.*

*23. The steering shaft modifier of claim 22, wherein the part has a shape corresponding to a shape of the coupling hole of the frame.*

*24. The steering shaft modifier of claim 23, wherein the part includes a shaft coupling part.*

* * * * *